United States Patent [19]

MacLeay et al.

[11] Patent Number: 5,314,970
[45] Date of Patent: May 24, 1994

[54] OO-T-ALKYL O-POLYCAPROLACTONE MONOPEROXYCARBONATES

[75] Inventors: Ronald E. MacLeay, Amherst; Jennifer P. Kmiec, Tonawanda; Robert T. Kazmierczak, Amherst, all of N.Y.

[73] Assignee: Elf Atochem North America, Inc., Philadelphia, Pa.

[21] Appl. No.: 1,925

[22] Filed: Jan. 7, 1993

[51] Int. Cl.$^5$ ............................................. C08F 283/00
[52] U.S. Cl. ..................................... 525/450; 525/417
[58] Field of Search ............................... 525/417, 450

[56] References Cited

U.S. PATENT DOCUMENTS

| | | |
|---|---|---|
| 3,523,920 | 8/1970 | Schultz . |
| 3,671,651 | 7/1972 | D'Angelo . |
| 3,935,243 | 1/1976 | Priody . |
| 4,238,381 | 12/1980 | Komai et al. ................... 524/529 |
| 4,304,882 | 12/1981 | D'Angelo ......................... 525/98 |
| 4,603,171 | 7/1986 | Hsieh et al. ..................... 525/105 |
| 4,659,769 | 4/1987 | Ohmura et al. .................. 524/529 |
| 5,003,038 | 3/1991 | Malfroid et al. ................. 528/357 |
| 5,032,671 | 7/1991 | Harper ............................ 528/357 |
| 5,039,754 | 8/1991 | Sanchez ......................... 525/333.8 |
| 5,043,414 | 8/1991 | Fewkes, Jr. ..................... 528/198 |

FOREIGN PATENT DOCUMENTS

| | | | |
|---|---|---|---|
| 416372 | 3/1991 | European Pat. Off. | C08G 64/14 |
| 418913 | 3/1991 | European Pat. Off. | C08L 63/10 |

OTHER PUBLICATIONS

D. R. Paul, S. Newman, eds., "Polymer Blends", vol. 1, Chapter 2, Academic Press, New York, 1978.
N. G. Gaylord, J. Macromol Sci.-Chem., A26(8), pp. 1211-1229 (1989).
C. Hepburn, RubberWorld, (vol. 190, No. 2,) pp. 49-60, May 1984.
H. L. Hsieh, Polym. Prepr. Am. Chem. Soc., Div. Polym. Chem., 17, 200-204 (1976).
J. V. Koleske, "Polymer Blends", D. R. Paul, S. Newman, eds., vol.2, Chap. 22, p. 370, Academic Press, New York, 1978.
A. Hamitou, et al., J. Polym. Sci., Polym, Chem. Ed., 15, 865-873 (1977).
M. Osgan, Ph. Teyssie, Polymer Letters, vol. 5, pp. 789-792 (1967).

Primary Examiner—John Kight, III
Assistant Examiner—T. Mosley
Attorney, Agent, or Firm—Stanley A. Marcus; Royal E. Bright

[57] ABSTRACT

OO-t-alkyl O-polycaprolactone monoperoxy carbonate compounds comprising polycaprolactones end capped with OO-t-alkyl peroxy carbonate groups which compounds are useful in the preparation of polycaprolactone block and graft copolymers are disclosed. Also disclosed are processes for the preparation and use of the above compounds including use of the above compounds as compatibilizing agents for otherwise immiscible polymers, as well as intermediates useful in the preparative processes.

14 Claims, No Drawings

OO-T-ALKYL O-POLYCAPROLACTONE MONOPEROXYCARBONATES

BACKGROUND OF THE INVENTION

1. Field of the Invention

This invention relates to compositions classified in the art of chemistry as polymeric peroxides which are useful in the preparation of polycaprolactone block and graft copolymers, processes for their preparation and use and to intermediates for use in said processes, and to the use of said copolymers as compatibilizing agents for blends of immiscible polymers. More specifically, this invention relates to polycaprolactones end-capped with OO-t-alkylperoxy carbonate groups.

The blending of block copolymers with other polymers, in which the block components are compatible, is a well known method of compatibilizing blends of immiscible polymers. Poly(e-caprolactones) are compatible with a large number of commercial polymers, such as polypropylene, polyurethane, polyurea, poly(vinyl chloride), epoxy resins, polycarbonates, acrylonitrile-butadiene-styrene (ABS), styrene-acrylonitrile (SAN) and styrene-maleic anhydride copolymers (See D. R. Paul and S. Newman, eds., "Polymer Blends", Vol. 1, Chapter 2, Academic Press, New York, 1978). Consequently block copolymers of poly(e-caprolactones) have been found to be extremely useful as compatibilizing agents for a variety of polymer blends. They act as polymeric surfactants, lowering surface tension and promoting interfacial adhesion between the dispersed phase and the matrix phase in the polymer blend [N. G. Gaylord, J. Macromol. Sci.-Chem., A26(8), pp 1211–1229 (1989)].

However, all these block copolymers have been prepared by step-wise anionic polymerization of one monomer and then the other. This limits the variety of poly(e-caprolactone) block copolymers to those where the other polymer in the block copolymer can be prepared by anionic polymerization. There are some drawbacks to the anionic method of preparation. For example, in U.S. Pat. No. 4,603,171 it is reported that the alkyllithium-initiated polystyryl and polydienyl anions, or their corresponding oxyl-terminated anions, have been used to cross-initiate caprolactone polymerization. It further states that, "It has proved very difficult to channel the esterification reactions under the basic environment into the desired mode of selectivity to the exclusion of unzipping and scrambling transesterification as the side reactions compete with polyester formation. The depolyesterification due to intramolecular transesterification, e.g. unzipping or backbiting phenomena, produces cyclic ester oligomer contamination. Intermolecular transesterification (ester scrambling) generally results in uncontrolled molecular weight distribution."

The polymeric peroxides of this invention are capable of generating block copolymers with any free radical polymerizable monomer. Thus the variety of poly(e-caprolactone) block copolymers that may be commercially produced is broadened considerably. Likewise, the variety of polymer blends that can be compatibilized by poly(e-caprolactone) copolymers also increases.

2. Description of the Prior Art

Polymers containing peroxide groups are well known in the art. However, most of these peroxides have the peroxide groups in the polymer backbone and when the peroxide decomposes, the polymer backbone fragments.

The present patent disclosure is only concerned with polymeric peroxides where the peroxide groups are terminal groups so when they fragment, the poly(e-caprolactone) backbone remains intact and the free radicals generated on the polymer terminals can initiate polymerization and generate block copolymers.

U.S. Pat. Nos. 3,671,651 and 4,304,882 broadly disclose polymers with attached peroxide groups. These peroxy polymers were produced by the reaction of a peroxide containing an acylating agent, such as a haloformate or an acid halide group, and polymeric materials containing terminal or pendant hydroxyl, amino, mercapto or any other functional group that can be acylated. In general, U.S. Pat. No. 3,671,651 teaches that a peroxide with a discrete acylating functionality (i.e. the peroxide is separated from the acylating functionality by a 2–4 valent aliphatic, cycloaliphatic or aromatic diradical), such as an acid chloride or a chloroformate, can react with polymers containing terminal or pendant hydroxyl, amino, mercapto or any other functional group that can be acylated. The peroxides containing the acylating agents are difficult and somewhat dangerous to prepare and have not yet become commercial realities.

U.S. Pat. No. 3,671,651 specifically claims peroxy polymers in which the peroxide is attached to the polymer by either an ester or a carbonate group (i.e. connecting groups). Therefore, the peroxy polymers of U.S. Pat. No. 3,671,651 are outside the scope of this invention. U.S. Pat. No. 4,304,882 again teaches that peroxides with acylating functions can react with polymers containing terminal or pendant hydroxyl, amino or mercapto groups to form peroxy polymers. In the 4,304,882 patent, in addition to carbonate and ester linkages being claimed as connecting groups, amide and carbamate groups are also claimed as connecting groups linking the peroxide moiety to the polymer backbone. In neither patent is the peroxide group directly attached to the polymer backbone. In all cases the peroxide group is separated from the linking group by an aliphatic, cycloaliphatic or aromatic diradical. The patents specifically refer to prior art peroxy compounds containing acylating groups which fall outside the scope of U.S. Pat. No. 3,671,651 and U.S. Pat. No. 4,304,882 because the peroxy group is not separated from the acylating group and actually is a part of the acylating group. t-Alkylperoxy chloroformates were cited as examples of these prior art peroxides with acylating groups. Therefore, U.S. Pat. No. 3,671,651 and U.S. Pat. No. 4,304,882 actually were teaching away from the reaction of t-alkylperoxy chloroformates with polymers having terminal hydroxyl groups (which would provide the compounds of this invention by another synthetic route).

The polymeric materials disclosed in U.S. Pat. No. 4,304,882 were polyethers, polyesters, polyamides, polycarbonates, polybutadiene, polystyrene, poly(vinyl alcohol), partially hydrolyzed poly(vinyl acetate), cellulose, polybutadiene-polystyrene copolymer and any other polymeric material containing terminal or pendant groups selected from —OH, —NH$_2$, —NHR or SH. Specifically U.S. Pat. No. 4,304,882 describes polyesters prepared from aliphatic, cycloaliphatic, aromatic and heterocyclic dibasic acids and dihydroxy compounds. No mention is made of polylactones.

U.S. Pat. No. 4,304,882 states that the peroxy polymers can be used in making graft and block copolymers by treating them with polymerizable vinyl-type monomers under conditions where the peroxy-carbon linkage is decomposed into free radicals at a rate and temperature suitable for polymerizing the vinyl monomer. These block and graft copolymers are useful as compatibilizing agents. It states that when block and/or graft copolymers of two incompatible homopolymers are present, the system becomes much more, if not completely, compatibilized. There is no mention of preparing poly(caprolactone) copolymers. U.S. Pat. No. 3,935,243 describes dialkyl alkylenebis-(peroxydicarbonates) and corresponding higher polyfunctional peroxydicarbonic acid esters. These compounds are prepared by reacting a sodium alkylperoxycarbonate with a diol bis(chloroformate) at from about $-10°$ C. to about $20°$ C. The compounds have the general formula:

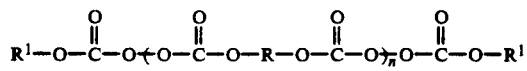

wherein $R^1$ is an alkyl radical of 1-6 carbon atoms, R is an alkylene radical of 2-8 carbons or a polyalkyleneoxy radical wherein each alkylene group has 2-4 carbon atoms and R has a maximum of about 12 carbon atoms and n is an integer, preferably 1-4.

Polymeric peroxydicarbonates were prepared by reacting the diol bis(chloroformate) with a mixture of a sodium alkylperoxycarbonate and sodium peroxide.

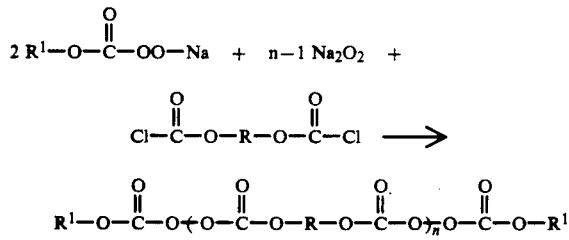

The products are low temperature peroxides which are stable when stored below $12°$ C. None of the diols used to prepare the bis(chloroformates) were polymeric or oligomeric diols. None of the diols were derived from caprolactone.

U.S. Pat. No. 3,523,920 teaches the crosslinking of polylactones with a free radical initiator to make the polylactones less sensitive to solvent attack and improve the softening points. The crosslinking agents were discrete free radical initiators that were added to the polylactones. None of the free radical initiators were attached to the polylactone chain.

European Patent EP 0,416,372 discloses peroxide terminated polycarbonates which are useful in the formation of copolymers which in turn are useful as compatibilizers for blends of polycarbonates with other polymers. The peroxide terminated polycarbonates are prepared by reacting dihydroxyaromatic compounds of formula

HO-A$^2$-Y-A$^3$-OH and phosgene in the presence of a peroxy ester of formula

as a chain terminating agent. A copolycarbonate is prepared by the reaction of a peroxide terminated polycarbonate with an ethylenically unsaturated compound, preferably a polymerizable monomer such as styrene, maleic anhydride and acrylonitrile.

U.S. Pat. No. 5,043,414 teaches the preparation of polycarbonates having terminal t-alkylperoxyformate groups. These peroxypolymers were prepared and then heated to high temperatures where the peroxy groups rearranged and decomposed in the presence of traces of water into hydroxy-terminated polycarbonates. The t-alkylperoxyformate terminated polycarbonates were prepared by the reaction of an aromatic dihydroxy compound, preferably a bisphenol, with phosgene in one or two steps, in the presence of a small amount of a t-alkyl hydroperoxide which was used as a chainstopper. They were not used as initiators of free radical polymerization or for grafting onto other polymers.

European Patent EP 0,418,913 A2 teaches the preparation of polymeric azo compounds by reacting condensation polymers containing functional groups with azo compounds containing co-reactive functional groups. The compounds were referred to as condensation polymer radical polymerization initiators. Since the condensation polymers were difunctional and the azo compounds were difunctional, polymers were obtained containing azo groups in the backbone. Examples were given where polycaprolactone was reacted with toluenediisocyanate to give polycaprolactone endcapped on both ends with isocyanate groups. The isocyanate functionalized caprolactone was then reacted with 2,2'-azobis[2-methyl-N(2-hydroxyethyl)propionamide] to form the polymeric azo compound. In a second example, the polymeric azo compound was prepared in 1 step by heating a mixture of polycaprolactone, 2,2'-azobis[2-methyl-N(2-hydroxyethyl)propionamide], diphenylmethanediisocyanate and a catalytic amount of stannous octoate. The polymeric azo compounds were decomposed in the presence of styrene to form a polycaprolactone-polystyrene block copolymer. The block copolymer was used as a low-profile additive in the curing of polyester resins.

U.S. Pat. No. 5,039,754 teaches polymeric peroxides containing a divalent recurring unit having the following formula:

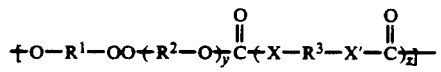

wherein the recurring unit has a 10 hour half life temperature of at least $80°$ C. and $R^3$ may be a polymeric radical of up to about 5,000. The polymeric peroxides are derived from the condensation polymerization of hydroxy-hydroperoxides and/or dihydroxy dialkylperoxides with difunctional co-reactants, such as phosgene, a bis-haloformate, a polyhaloformate, a diacid halide, a polyacid halide, a diisocyanate, a polyisocyanate and a dianhydride to form a peroxy-containing polymer. Suitable bis-chloroformates include the bis-chloroformates of polycaprolactone diols. In such a case the $R^3$ divalent radical would have the following formula:

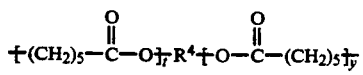

These peroxy polymers were useful in preparing block copolymers. These compounds in contrast to the compounds of this invention fragment along the polymer backbone to form numerous radicals whereas the peroxy-terminated polymers of this invention only fragment at the end of the polymer chain. Consequently, essentially the total weight of the peroxy-terminated polymer of this invention, instead of just a fragment, is incorporated into the block copolymer.

C. Hepburn in Rubber World (Vol. 190 No. 2, pp 49-60, May 1984) reported on the use of bis(peroxycarbamates) as crosslinking agents for the vulcanization of rubber. A bis(peroxycarbamate) with a poly(e-caprolactone) backbone was prepared by reacting hydroxy-terminated poly(e-caprolactone) with an excess of isophorone diisocyanate end groups. The prepolymer was then reacted with 100% t-butyl hydroperoxide in the presence of triethylamine catalyst. The resulting polymeric bis(peroxycarbamate) was evaluated in the curing of natural rubber and isoprene rubber. It had a low curing efficiency and therefore was not evaluated any further. The polymeric bis(peroxycarbamate) is the only example to our knowledge of peroxy terminated poly(e-caprolactone).

SUMMARY OF THE INVENTION

The invention provides in a first composition aspect peroxy-terminated poly(e-caprolactones) of formula I having the following general structure:

$$(A-X-)_m-R-(-X'-B)_n \quad\quad I$$

wherein:
A is

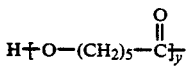

B is

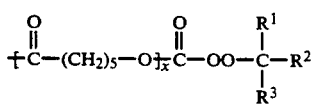

m is an integer of 0 to 3,
n is an integer of 1 to 4,
and m+n is an integer of 1 to 4;
$R^1$ and $R^2$ are the same or different and are alkyl groups having 1 to 4 carbon atoms;
$R^3$ is an alkyl group having 1 to 12 carbons or an acetylenic group of 2 to 12 carbons;
y is an integer and may vary from 0 to about 10,000;
x is an integer and may vary from 4 to about 22,000;
and $(y)(m)+(x)(n)$ is an integer and may vary from about 4 to about 22,000;
X and X' are independently selected from —O—, or —N($R^4$)—;
R is a substituted or unsubstituted aliphatic, alicyclic, aromatic or araliphatic radical, diradical, triradical or tetraradical,
when n+m is 1, R is a substituted or unsubstituted aliphatic radical of 1 to 20 carbons, a substituted or unsubstituted alicyclic radical of 5 to 18 carbons, a substituted or unsubstituted aromatic radical of 6 to 14 carbons, a substituted or unsubstituted araliphatic radical of 7 to 22 carbons and a substituted or unsubstituted aromatic or non-aromatic heterocyclic radical of 5 to 12 carbons,
when n+m is 2, R is a substituted or unsubstituted aliphatic diradical of 2 to 20 carbons, a substituted or unsubstituted aliphatic diradical of 4 to 20 carbons which is interrupted by one to three —O—, —S— or —N($R^4$)— groups in the chain with the proviso that multiple heteroatoms must be separated from each other and the diradical chain ends by at least two carbon atoms, a substituted or unsubstituted alicyclic diradical of 5 to 18 carbons, a substituted or unsubstituted aromatic diradical of 6 to 12 carbons where R is a hydrocarbon group with two free valencies and at least one aromatic carbocyclic unit and a substituted or unsubstituted araliphatic diradical of 7 to 22 carbons,
when n+m is 3, R is a substituted or unsubstituted aliphatic triradical of 3 to 20 carbons, a substituted or unsubstituted alicyclic triradical of 5 to 18 carbons, a substituted or unsubstituted aromatic triradical of 6 to 14 carbons and a substituted or unsubstituted araliphatic triradical of 7 to 22 carbons,
when n+m is 4, R is a substituted or unsubstituted aliphatic tetraradical of 4 to 20 carbons, a substituted or unsubstituted alicyclic tetraradical of 6 to 18 carbons, a substituted or unsubstituted aromatic tetraradical of 6 to 14 carbons and a substituted or unsubstituted araliphatic tetraradical of 7 to 22 carbons;
$R^4$ is hydrogen, substituted or unsubstituted aliphatic of 1-20 carbons, substituted or unsubstituted alicyclic of 5-18 carbons, substituted or unsubstituted aromatic of 6-14 carbons and substituted or unsubstituted araliphatic of 7-22 carbons; and
suitable substituents for R and $R^4$ include one or more of the following: chloro, bromo, alkyl of 1-8 carbons, alkoxy of 1-12 carbons, aryloxy of 6-10 carbons, cyano, and additional suitable substitutents for R include one or more of the following: acyloxy of 1-4 carbons, acryloyloxy and methacryloyloxy.

Preferably:
$R^1$ and $R^2$ are methyl groups, $R^3$ is methyl, ethyl, propyl, isopropyl, butyl, neopentyl or ethynyl; $R^4$ is hydrogen, alkyl of 1-8 carbons, cycloalkyl of 5-8 carbons, aryl of 6-10 carbons or aralkyl of 7-9 carbons; n is 1 or 2; m is 0; (n)(x) is an integer and may vary from about 9 to about 350;

More preferably:
when n is 1, R is a primary $C_1$-$C_{12}$ alkyl radical or an unsaturated $C_3$-$C_{12}$ alkenyl radical, either of which may be optionally substituted with a $C_1$-$C_4$ alkoxy group or a phenoxy group and x has a value of 10-350; and
when n is 2, R is a primary $C_2$-$C_{12}$ alkylene diradical or a primary $C_4$-$C_{12}$ alkenylene diradical, either of which may be optionally substituted with a $C_1$-$C_4$ alkoxy group or a phenoxy group and x has a value of 10-175.

Most preferably:
$R^1$ and $R^2$ are methyl groups; $R^3$ is a methyl or ethyl group; X and X' are —O—; n is 2; m is 0; (x)(n) is an integer and may vary from about 25 to about 130; and R is a primary $C_2$-$C_6$ unsubstituted alkylene diradical.

The tangible embodiments of the first composition aspect of the invention possess the inherent physical properties of being solids at normal ambient temperatures, are substantially insoluble in water and are generally soluble in halogenated organic solvents such as, for example, methylene chloride. The aforementioned physical characteristics taken together with the nature of the starting materials, the method of synthesis, and the determined active oxygen content further confirm the molecular structure hereinbefore set forth.

The tangible embodiments of the first composition aspect of the invention possess the inherent applied use characteristic of being reactive intermediates in the synthesis of the embodiments of the second composition aspect of the insertion and as initiators for free radical polymerization.

The invention provides in a second composition aspect copolymers of poly(e-caprolactone) selected from the group consisting of block copolymers of poly(e-caprolactone) and graft copolymers of poly(e-caprolactone), which copolymers comprise the products formed by decomposing at least one peroxy terminated poly(e-caprolactone) of the first composition aspect of the invention in the presence of at least one vinyl monomer or a polymer having abstractable hydrogen atoms.

The tangible embodiments of this second composition aspect of the invention possess the inherent general physical properties of being solids at normal ambient temperature, are substantially insoluble in water and soluble in solvents, such as, for example, amyl acetate. Examination of the aforesaid compounds by infrared spectrographic analysis, and differential scanning calorimetry reveals spectral and calorimetric data supporting the molecular structure hereinbefore set forth. The aforementioned physical characteristics taken together with the nature of the starting materials and the method of synthesis further confirm the molecular structure hereinbefore set forth.

The tangible embodiments of the second composition aspect of the invention possess the inherent applied use characteristic of being compatibilizing agents for creating compatible blends of two or more normally immiscible polymers one or more of which are compatible with poly(e-caprolactone) and the remaining one or more of which are compatible with the other portion of the copolymer of the second composition aspect of the inventor.

The invention provides in a third composition aspect compatibilized blends of at least two normally incompatible polymers which comprise a polylactone copolymer as defined in the second composition aspect of the invention and at least two normally immiscible polymers at least one of which is compatible with polycaprolactone and at least one of which is normally incompatible with polycaprolactone and is compatible with the other copolymer in said copolymer of the second composition aspect of the invention.

The tangible embodiments of the third composition aspect of the invention possess the inherent physical properties of being solids at normal ambient temperatures, are substantially insoluble in water and are generally swellable or soluble in organic solvents. The aforementioned physical characteristics taken together with the nature of the starting materials, the method of synthesis and the observed mechanical and physical properties positively confirm the molecular structure hereinbefore set forth.

The tangible embodiments of the third composition aspect of the invention possess the inherent applied use characteristics of providing improved processability and properties for normal uses of polymers such as in coatings and cast and extruded objects.

The invention provides in a first process aspect, a process for the use of embodiments of the first composition aspect of the invention in the preparatin of block copolymers of poly(e-caprolactone) which comprises initiating the free radical polymerization of a free radical polymerizable monomer using a polymeric peroxide of the first composition aspect of the invention.

The invention provides in a second process aspect, a process for the use of embodiments of the first composition aspect of the invention in the preparation of graft copolymers of poly(e-caprolactone) which comprises decomposing the peroxide groups of embodiments of the first composition aspect of the invention in the presence of a polymer with abstractable hydrogen atoms.

Special mention is made of embodiments of the second process aspect of the invention wherein the process is carried out in an extruder or other melt mixing apparatus.

The invention provides in a third process aspect, a process for the use of compositions of the first composition aspect of the invention in compatibilizing two or more immiscible polymers, at least one of which is compatible with poly(e-caprolactone) and the remainder of which contain hydrogen atoms abstractable by free radicals which comprises heating a mixture of said polymers and at least one peroxide polymer of the first composition aspect of the invention above the softening point of the polymer components and the decomposition point of the peroxide component while mixing.

Special mention is made of the third process aspect of the invention wherein the process is performed in a twin screen extruder or other suitable melt mixing apparatus.

DETAILED DESCRIPTION OF THE INVENTION

General Formula For The First Composition Aspect Of The Invention

The novel compounds of this invention comprise poly(e-caprolactone) polymers containing 1–4 t-alkyl monoperoxycarbonate end groups. They have the following general formula:

where A, X, R, X', B, m and n and all their substituents are as previously defined.

Generic Group Examples

Specific, non-limiting examples of particular constituent groups are as follows:

As an alkyl group of 1–4 carbon atoms, $R^1$ and $R^2$ may independently be, for example, methyl, ethyl, propyl, isopropyl, n-butyl, sec.-butyl, isobutyl and t-butyl.

As an alkyl group of 1–12 carbons, $R^3$ may be, for example, methyl, ethyl, propyl, butyl, neopentyl, octyl, decyl or dodecyl.

As an acetylenic group of 2 to 12 carbons, $R^3$ may be, for example, ethynyl, propynyl, butynyl or hexynyl.

As substituted or unsubstituted aliphatic of 1–20 carbons, R and $R^4$ are, for example, methyl, ethyl, n-propyl, isopropyl, butyl, isobutyl, n-pentyl, 3-pentyl, 4-methyl-3-pentyl, 2-ethylbutyl, 2-bromoethyl, hexyl, heptyl, 3-heptyl, octyl, 2-ethylhexyl, 2,6-dimethyl-4-heptyl, nonyl, decyl, dodecyl, octadecyl, 2-methallyl, 2-hexenyl, 10-undecenyl, allyl, butenyl, decenyl, oleyl, 2-methoxyethyl, 2-phenoxyethyl, 2-cyanoethyl, 3-ethoxypropyl, 2-chloroethyl, 2-acetoxyethyl or 2-methacryloyloxyethyl.

As substituted or unsubstituted alicyclic of 5–18 carbons, R and $R^4$ are, for example, cyclopentyl, methylcyclopentyl, cyclohexyl, dimethylcyclohexyl, trimethylcyclohexyl, cyclooctyl, propylcyclooctyl, cyclododecyl, 4-t-butylcyclohexyl, 3-cyclohexenyl, 4-octylcyclohexyl or cyclooctadecyl.

As substituted or unsubstituted aromatic radical of 6–14 carbons, R and $R^4$ are, for example, phenyl, tolyl, 4-chlorophenyl, isopropylphenyl, isopropenylphenyl, anisyl, 4-vinylphenyl, naphthyl, 3,4,5,-trimethoxyphenyl, 2-methoxyphenyl, 2-ethoxyphenyl or 2-isopropoxyphenyl.

As substituted or unsubstituted araliphatic of 7–22 carbons, R and $R^4$ are, for example, benzyl, 3-methylbenzyl, 4-methylbenzyl, 4-t-butylbenzyl, 2-phenylethyl, alpha, alpha-dimethylbenzyl, alpha-methylbenzyl, 1,3,5- trimethylbenzyl, 4-octoxybenzyl, naphthylmethyl, (4-dodecylphenyl)methyl or 3-phenylpropyl.

As a substituted or unsubstituted aromatic or non-aromatic heterocyclic group of 5–12 carbons, R is, for example, 4-oxacyclohexyl, 4-thiacyclohexyl, 4-azacyclohexyl, 5-oxacyclooctyl or pyridin-4-yl.

As a substituted or unsubstituted aliphatic diradical of 1–20 carbons, R is, for example, methylene, 1,2-ethanediyl, 1,2-propanediyl, 1,3-propanediyl, 2-methyl-1,2-propanediyl, 1,3- or 1,4-butanediyl, 1,18-octadecanediyl, 2-methyl-1,3-propanediyl, 2,2-dimethyl-1,3-propanediyl, 2,2-diethyl-1,3-propanediyl, 3-methyl-1,5-pentanediyl, 2-ethyl-2,5,5-trimethyl-1,6-hexanediyl, 2-ethyl-1,6-hexanediyl, 2-methyl-2,4-pentanediyl, 1,10-decanediyl, 1,12-dodecanediyl, 1,2-ethenediyl, 1,2-propenediyl, 1-chloro-1,2-ethenediyl, 1-phenyl-1,2-ethenediyl, 1,3-hexanediyl, 2-butene-1,4-diyl, ethylidene, propylidene, butylidene, pentylidene, 1-methylethylidene, 1-ethylpropylidene or 1-ethylpentylidene.

As a substituted or unsubstituted aliphatic diradical of 4–20 carbons which is interrupted by one to three —O—, —S— or —N($R^4$)— groups in the chain, R is, for example, 3-oxapentane-1,5-diyl, 4-oxaheptane-1,7-diyl, 3,6-dioxaoctane-1,8-diyl, 4,9-dioxadodecane-1,12-diyl, N-methyl-4-azaheptane-1,4-diyl, 3,6-diaza-3,6-dimethyl-1,8,-octanediyl or 3-methyl-3-azapentane-1,5-diyl.

As a substituted or unsubstituted alicyclic diradical of 5 to 18 carbons containing a saturated or unsaturated hydrocarbon group with two free valencies and at least one cyclic unit, R is, for example, cycloalkylene of 5–18 carbons, such as, 1,2-cyclopentanediyl, 1,3-cyclopentanediyl, 1,2-cyclohexanediyl, 1,4-cyclohexanediyl, 1,2-cyclohexanediyl, 4-methyl-4-cyclohexene-1,2-diyl, 4-cyclohexene-1,2-diyl, 4-methylcyclohexane-1,2-diyl; cycloalkylenedialkylene of 7 to 18 carbons, such as, cyclohexylenedimethylene, cyclopentylenedimethylene and cyclooctylenedimethylene; alkylenedicycloalkylene of 11 to 18 carbons, such as, 3,3' and 4,4'-methylenebiscyclohexyl and 4,4'-methylenebis(3-methylcyclohexyl); and alkylidenedicycloalkylene of 12 to 18 carbons, such as, isopropylidenedicyclohexane-4,4'-diyl, ethylidenedicyclohexane-4,4'-diyl and butylidenedicyclooctane-4,4'-diyl.

As a substituted or unsubstituted aromatic diradical of 6 to 12 carbons, R is, for example, o, m, or p-phenylene substituted or unsubstituted by alkyl of 1–8 carbons, 4-methoxy-1,2-phenylene, biphenyl-4,4'-diyl, biphenyl-3,3'-diyl, biphenyl-3,4'-diyl, methylenebis(4-phenyl), isopropylidene-4,4'-diphenylene or naphthylene.

As a substituted or unsubstituted araliphatic diradical of 7 to 22 carbons, R is, for example, toluene-alpha,2-diyl, toluene-alpha,4-diyl, toluene-alpha,3-diyl, o, m or p-xylylene, methylenediphenylene, benzylidene, 2-phenylethylidene, 2-hexylidene, methylenebis(2-methyl-4-phenylene), methylenebis-(3,5-dimethyl-4-phenylene) and isopropylidene-4,4'-diphenylene.

As a substituted or unsubstituted aromatic or non-aromatic heterocyclic diradical of 5 to 12 carbons, R is, for example, 3-oxapentane-1,5-diyl, 3-oxacyclohexane-1,4-diyl, 4-azacyclohexane-1,3-diyl, 4-oxacycloheptane-2,6-diyl.

As a substituted or unsubstituted aliphatic triradical of 3 to 20 carbons, a substituted or unsubstituted alicyclic triradical of 5 to 12 carbons, a substituted or unsubstituted aromatic triradical of 6 to 14 carbons, a substituted or unsubstituted araliphatic triradical of 7 to 22 carbons and a substituted or unsubstituted aromatic or non-aromatic heterocyclic triradical of 5 to 12 carbons, R is, for example, glyceryl, 1,2,4-butanetriyl, 1,2,6-hexanetriyl, 1,3,5-pentanetriyl, 2-ethyl-isobutanetriyl, 2,2-dimethylpropane-alpha,1,3-triyl, 2,2-dimethylbutane-alpha,alpha,1-triyl, 1,3,5-cyclohexanetriyl, benzene-1,3,5-triyl, toluene-alpha,2,4-triyl, mesitylene-1,3,5-triyl, 1,2,4-trimethylbenzene-alpha,alpha',alpha"-triyl.

As a substituted or unsubstituted aliphatic tetraradical of 4 to 20 carbons, a substituted or unsubstituted alicyclic tetraradical of 6 to 18 carbons, a substituted or unsubstituted aromatic tetraradical of 6 to 14 carbons, a substituted or unsubstituted araliphatic tetraradical of 7 to 22 carbons and a substituted or unsubstituted aromatic or non-aromatic heterocyclic tetraradical of 5 to 12 carbons, R is, for example, erythrityl, pentaerythrityl or 1,2,3,4-butanetetrayl.

As alkyl of 1–8 carbons, the optional substituents are, for example, methyl, ethyl, propyl, isopropyl, n-butyl, isobutyl, sec.-butyl, t-butyl, pentyl, hexyl, octyl or t-octyl.

As alkoxy of 1–12 carbons, the optional substituents are, for example, methoxy, ethoxy, 2-ethylhexoxy, isopropoxy, butoxy, t-butoxy, hexoxy, octoxy, t-octoxy, decoxy or dodecoxy.

As aryloxy of 6–10 carbons, the optional substituents are, for example, phenoxy, 4-t-butylphenoxy, 2-methylphenoxy, naphthoxy or 4-isopropylphenoxy.

As acyloxy of 1–4 carbons, the optional substituents are, for example, acetoxy, propionyloxy, butyroyloxy or isobutyroyloxy.

List of Example Compounds

Examples of poly(e-caprolactones) endcapped with t-alkyl monoperoxycarbonates of the present invention include the following non-limiting list of compounds:

1. O,O-Poly(e-caprolactone)diyl bis(OO-1,1-dimethylbutyl monoperoxycarbonate) (mol. wt. approx. 3100)
2. O,O-Poly(e-caprolactone)diyl bis(OO-1,1-dimethylpentyl monoperoxycarbonate) (mol. wt. approx. 3100)
3. O,O-Poly(e-caprolactone)diyl bis(OO-1,1-dimethylbutyl monoperoxycarbonate) (mol. wt. approx. 15200)

4. O,O-Poly(e-caprolactone)diyl bis(OO-t-amyl monoperoxycarbonate) (mol. wt. approx. 40000)
5. O,O-Poly(e-caprolactone)diyl bis(OO-1,1,3,3tetramethylbutyl monoperoxycarbonate) (mol. wt. approx. 3100)
6. O,O-Poly(e-caprolactone)diyl bis(OO-1,1,3,3tetramethylbutyl monoperoxycarbonate) (mol. wt. approx. 2200)
7. O,O-Poly(e-caprolactone)diyl bis(OO-1,1-diethylethyl monoperoxycarbonate) (mol. wt. approx. 15200)
8. O,O-Poly(e-caprolactone)diyl bis(OO-1,1-dimethylbutyl monoperoxycarbonate) (mol. wt. approx. 1200)
9. O,O-Poly(e-caprolactone)diyl bis(OO-1,1-dimethyldodecyl monoperoxycarbonate) (mol. wt. approx. 3200)
10. O,O-Poly(e-caprolactone)diyl bis(OO-1,1-dimethyloctyl monoperoxycarbonate) (mol. wt. approx. 15200)
11. O,O,O-Poly(e-caprolactone)triyl tris(OO-t-butyl monoperoxycarbonate) (mol. wt. approx. 1250)
12. O,O,O-Poly(e-caprolactone)triyl tris(OO-t-amyl monoperoxycarbonate) (mol. wt. approx. 900)
13. O,O,O,O-Poly(e-caprolactone)tetryl tetrakis(OO-t-butyl monoperoxycarbonate) (mol. wt. approx. 1500)
14. O,O,O,O-Poly(e-caprolactone)tetryl tetrakis(OO-t-amyl monoperoxycarbonate) (mol. wt. approx. 1500)
15. O-Methoxypoly(e-caprolactone)yl OO-t-butyl monoperoxycarbonate) (mol. wt. approx. 15200)
16. O-Ethoxypoly(e-caprolactone)yl OO-t-amyl monoperoxycarbonate) (mol. wt. approx. 15200)
17. O-Phenoxypoly(e-caprolactone)yl OO-t-butyl monoperoxycarbonate) (mol. wt. approx. 15200)
18. O-Butoxypoly(e-caprolactone)yl OO-t-amyl monoperoxycarbonate) (mol. wt. approx. 15200)
19. O-Hydroxypoly(e-caprolactone)yl OO-t-butyl monoperoxycarbonate) (mol. wt. approx. 15200)
20. O-Hydroxypoly(e-caprolactone)yl OO-t-amyl monoperoxycarbonate) (mol. wt. approx. 15200)
21. O-Hydroxypoly(e-caprolactone)yl OO-t-butyl monoperoxycarbonate) (mol. wt. approx. 3200)
22. O-Hydroxypoly(e-caprolactone)yl OO-t-amyl monoperoxycarbonate) (mol. wt. approx. 3200)
23. O-Hydroxypoly(e-caprolactone)yl OO-t-butyl monoperoxycarbonate) (mol. wt. approx. 40100)
24. O-Hydroxypoly(e-caprolactone)yl OO-t-amyl monoperoxycarbonate) (mol. wt. approx. 40100)
25. O-Acryloyloxypoly(e-caprolactone)yl OO-t-butyl monoperoxycarbonate) (mol. wt. approx. 15100)
26. O-Methacryloyloxypoly(e-caprolactone)yl OO-t-amyl monoperoxycarbonate) (mol. wt. approx. 15100)
27. O,O-Poly(e-caprolactone)diyl bis(OO-1,1-dimethylpropynyl monoperoxycarbonate) (mol. wt. approx. 3100)

Preparative Methods

OO-t-Alkyl O-Poly(e-caprolactone) Monoperoxycarbonates

The novel compounds of the first composition aspect of this invention are poly(e-caprolactones) having 1–4 terminal OO-t-alkyl monoperoxycarbonate groups. They are prepared by converting poly(e-caprolactones) containing 1–4 terminal hydroxyl groups to the corresponding poly(e-caprolactones) having terminal chloroformate groups by reaction with phosgene, optionally in the presence of a t-amine acid acceptor. The chloroformate groups are then converted to the OO-t-alkyl monoperoxycarbonate groups by reaction with excess t-alkyl hydroperoxide in the presence of an acid acceptor. Preferably, the acid acceptor is a tertiary amine and a small amount of 4-dimethylaminopyridine is employed as a catalyst. The peroxidations may also be run by reacting the polymeric chloroformates with aqueous solutions of the sodium or potassium salts of the tertiary hydroperoxides.

The novel compounds of the first composition aspect of the invention also include those poly(e-caprolactones) in which at least one of the terminal hydroxy groups is converted to an OO-t-alkyl monoperoxycarbonate group. It is not necessary to convert all the terminal hydroxy groups in the multihydroxy substituted poly(e-caprolactones) to OO-t-alkyl monoperoxycarbonate groups. Under normal reaction conditions approximately 80–90% of the hydroxyl groups are converted to OO-t-alkyl monoperoxycarbonate groups. Any residual chloroformate groups present in the polymer at the conclusion of the peroxidation reaction are hydrolyzed back to hydroxyl groups during the workup of the final product.

Any poly(e-caprolactone) containing 1–4 terminal hydroxy groups and having a molecular weight of approximately 500 to 250,000 is a suitable starting material for the polymeric peroxides of this invention. Preferably, the poly(e-caprolactone) is a mono or dihydroxy terminated poly(e-caprolactone) of approximately 1,000 to 40,000 molecular weight. Most preferably, the poly(e-caprolactone) is a dihydroxy terminated poly(e-caprolactone) of approximately 3,000 to 15,000 molecular weight.

Poly(e-caprolactones) suitable as starting materials for the peroxy-terminated poly(e-caprolactones) of this invention include hydroxy-terminated poly(e-caprolactones) generated from active anionic catalysts such as aluminum alkyls, aluminum trialkoxides, metal alkyls of Group Ia, IIa, IIb or IIIa, Grignard reagents, metal amides, alkaline earth, aluminum or boron hydrides, alkali metals, metal hydrides, alcohols, amines or amino alcohols [H. L. Hsieh, Polym. Prepr., Am. Chem. Soc., Div. Polym. Chem., 17, 200–204 (1976)].

The hydroxy terminated poly(e-caprolactone) starting materials are prepared in a variety of ways. Generally, poly(e-caprolactone) is prepared from e-caprolactone through an addition type mechanism using an active hydrogen-containing initiator. The initiators control the molecular weight and functionality of the resulting polycaprolactone. The initiator reacts with the e-caprolactone monomer in the presence of a catalyst to ring open the monomer. The molecular weight of the growing polymer chain increases as additional monomer units are added. The functionality of the product will be approximately the same as the functionality of the active hydrogen-containing initiator. The molecular weight is regulated by controlling the mole ratio of polymerizable monomer to initiator.

For example, when an alcohol is used as the initiator, a monohydroxy-terminated poly(e-caprolactone) is obtained in the following manner:

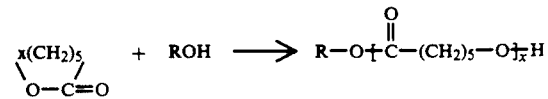

When a diol is used as the initiator, a dihydroxy-terminated poly(e-caprolactone) is obtained [J. V. Koleske, "Polymer Blends", D. R. Paul and S. Newman, eds., Vol. 2, Chapter 22, p. 370, Academic Press, New York, N.Y., 1978].

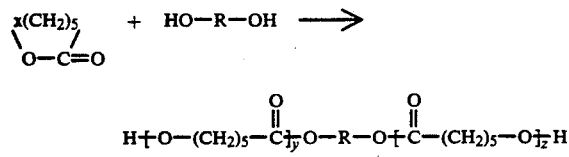

Likewise using a triol as the initiator will produce a trihydroxy-terminated poly(e-caprolactone) and a tetrahydroxy substituted initiator will generate a tetrahydroxy-terminated poly(e-caprolactone). Commercially, the poly(e-caprolactones) are generally prepared from ionic catalysts prepared from metalalkyls and alcohols. The ionic catalysts may be complexed with ethers, such as tetrahydrofuran. The general structure of the poly(e-caprolactone) is essentially the same, but the polymerization is cleaner, easier to control and it proceeds to higher molecular weight when the ionic catalyst is used as the initiator instead of an alcohol.

For example, when the catalyst is the reaction product of an aluminum alkyl and an alcohol (ROH), the polymerization data is consistent with the a mechanism of insertion of the lactone monomer into the metal-heteroatom bond (Al-O in this case). Acyl-oxygen cleavage of the lactone ring occurs specifically in a direction which maintains the binding of the chain to the catalyst through an alkoxide linkage rather than a carboxylate linkage. Hydrolysis of the alkoxide linkage at the completion of the polymerization with dilute acid generates the hydroxy-terminated poly(e-caprolactone).

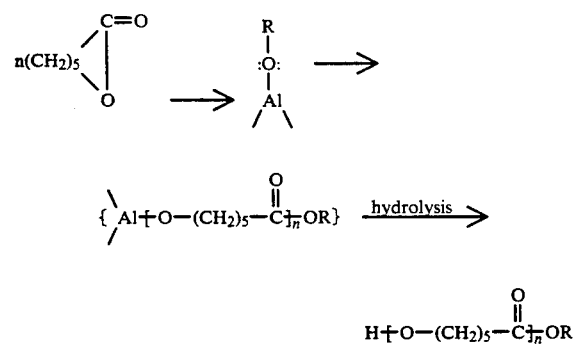

[A. Hamitou, T. Ouhadi, R. Jerome and Ph. Teyssie, J. Polym. Sci., Polym. Chem. Ed., 15, 865-873 (1977)].

The metalalkyls employed are advantageously those in which the alkyl groups are identical or different and are selected from straight or branched chain alkyl groups containing from 1-18 carbon atoms. Preferably, the alkyl groups of the metalalkyls are identical and contain from 2-12 carbon atoms and most preferably contain 2-6 carbon atoms. The metal of the metalalkyl is selected from lithium, magnesium, zinc, titanium, zirconium, tin and aluminum. Preferably, the metal of the metalalkyl is aluminum and/or zinc and most preferably the metal is aluminum [U.S. Pat. No. 5,003,038].

Preferably, the ionic catalysts are the bimetallic mu-oxoalkoxides. They may be prepared by reaction of a metal alkoxide with a metal carboxylate [M. Osgan and Ph. Teyssie, Polymer Letters, Vol. 5, pp. 789-792 (1967)].

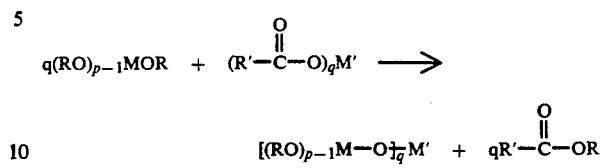

Such coordination-type initiators containing several metal atoms linked together by mu-oxo bridges are highly active and helpful in controlling the chain-growth processes [A. Hamitou, T. Ouhadi, R. Jerome and Ph. Teyssie, J. Polym. Sci., Polym. Chem. Ed., Vol. 15, 865-873(1977)].

Double metal cyanide catalysts may also be used in conjunction with active hydrogen-containing initiators to polymerize e-caprolactone into suitable hydroxy-terminated poly(e-caprolactone)(See U.S. Pat. No. 5,032,671).

Poly(e-caprolactones) are available from Union Carbide Corporation PCL ® 700 and 300 and TONE ® 260 and 220 are dihydroxy terminated polymers having molecular weights of approximately 40,000, 15,000, 3,000 and 1,000 respectively. Additional dihydroxy-terminated poly(e-caprolactones) available from Union Carbide Corporation include TONE 200 (mol. wt. 530), 210 (mol. wt. 830), 230 (mol. wt. 1250) and 240 (mol. wt. 2000). TONE 0305 and 0310 are trihydroxy-terminated poly(e-caprolactones) having molecular weights of approximately 540 and 900.

The hydroxy-terminated poly(e-caprolactones) are converted to the corresponding chloroformate-terminated poly(e-caprolactones) in the presence of phosgene.

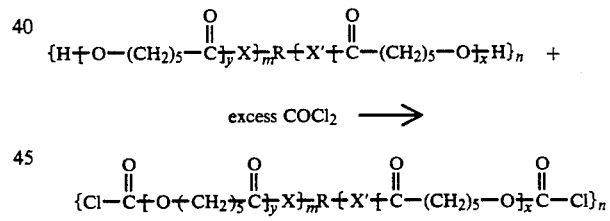

Preferably, the reaction is run by adding an excess of phosgene to a slurry or solution of the hydroxy-terminated poly(e-caprolactone) in an inert solvent. Suitable solvents include aromatic hydrocarbons, such as toluene, xylene and mesitylene, chlorinated hydrocarbons, such as methylene chloride, chloroform, carbon tetrachloride, 1,2-dichloroethane, trichloroethylene and methylchloroform, ethers, such as diethyl ether, dioxane, tetrahydrofuran and methyl t-butyl ether. The reaction may be carried out from 0° C. to the reflux temperature of the solvent. The phosgene may be added to the solution in liquid form or may be bubbled into the reaction mixture. Normally, at least 25% to 200% excess phosgene is employed. A sufficiently efficient low temperature reflux condenser is required to condense any phosgene that vaporizes during the phosgene addition or the reaction period. The higher the reaction temperature and the higher the excess phosgene, the more efficient the reflux condenser should be. The reaction is carried out for a sufficient length of time to convert essentially all the terminal hydroxyl groups to chloroformate groups. The reaction time required decreases as the reaction temperature and/or excess phosgene increases. t-Amine acid acceptors may be employed, but usually are not necessary. The conversion of the hydroxyl group to the chloroformate group may be monitored by infrared spectroscopy.

After essentially complete conversion of the hydroxyl groups to chloroformate groups, the excess phosgene is removed from the reaction mixture. Preferably, it is distilled off under reduced pressure and condensed for recycle. The chloroformate-terminated poly(e-caprolactone) may be isolated by precipitation with a non-solvent, such as methyl t-butyl ether or the solvent may be stripped off under reduced pressure. However, it is not necessary to isolate the chloroformate as long as the excess phosgene has been removed.

The chloroformate-terminated poly(e-caprolactones) are converted to the poly(e-caprolactones) end-capped with OO-t-alkyl monoperoxycarbonate groups by reaction with an excess of a t-alkyl hydroperoxide in the presence of an acid acceptor.

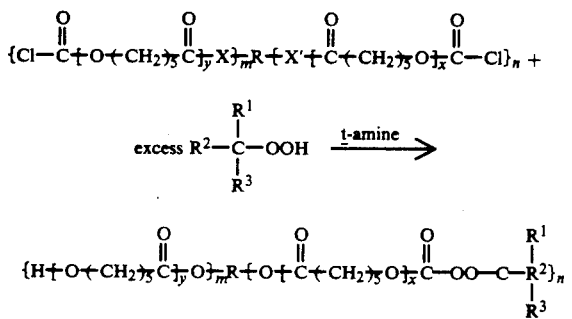

Preferably, the acid acceptor is a t-amine such as triethylamine, trimethylamine, tributylamine, pyridine, 4-dimethylaminopyridine and 1,4-diazabicyclo[2.2.2]octane. The reaction is run as a solution or as a slurry in an inert solvent. Suitable solvents include aromatic hydrocarbons, chlorinated hydrocarbons and ethers such as previously described for the chloroformate reaction. The reaction may be carried out at −10° C. to 50° C. Preferably, the reaction is carried out from 0° C. to 35° C. Normally, the t-alkyl hydroperoxide is added to a solution of the chloroformate-terminated polycaprolactone and t-amine but the order of addition is not critical. The t-alkyl hydroperoxide need not be anhydrous. Aqueous solutions of the t-alkyl hydroperoxide are acceptable. Preferably an aqueous solution of the t-alkyl hydroperoxide contains no more than 55% water. Equal equivalents of t-alkyl hydroperoxide to chloroformate are necessary to convert all the chloroformate groups to OO-t-alkyl monoperoxycarbonate groups. Preferably, at least a 50%-200% excess of the hydroperoxide is employed. Preferably, a 5% to 100% excess of t-amine over chloroformate is employed. Most preferably, a small amount (5-10% of the chloroformate equivalents) of 4-dimethylaminopyridine is employed as a catalyst. To insure high conversion of the chloroformate groups to the monoperoxycarbonate groups of the high molecular weight polymers, it is advantageous to use 4-dimethylaminopyridine as the t-amine base. The excess amine and the amine hydrochloride that forms in the reaction are removed by a dilute acid wash. Any excess t-alkyl hydroperoxide is removed by washing with a solution of an excess of a suitable reducing agent.

Preferably a 5-10% solution of aqueous sodium bisulfite is used. The excess t-alkyl hydroperoxide may also be separated from the product by precipitating the product into a non-solvent and filtering off the peroxy polymer. The excess t-alkyl hydroperoxide will remain in the solvent filtrate. Suitable non-solvents include methyl t-butyl ether and aliphatic hydrocarbons, such as pentane, hexane, cyclohexane, heptane, decane and dodecane.

The peroxy polymer is isolated by precipitating the polymer into a non-solvent or by stripping off the solvent under reduced pressure at a suitable temperature. If the product is isolated by precipitation and filtration, it should be dried of any residual solvent in a suitable manner, such as air drying or drying in a vacuum oven under reduced pressure until essentially constant weight is obtained. If the product is isolated by stripping off the solvent, the stripping should be carried out at a low enough temperature that no significant decomposition of the peroxide occurs. Preferably, the temperature should be held below 65° C., and most preferably below 55° C. Likewise, any drying steps should be carried out at a low enough temperature that no significant decomposition of the peroxide occurs.

The peroxidation step may also be carried out by reacting a solution of the polymeric chloroformate with an aqueous solution of a metal salt of the hydroperoxide, preferably the sodium or potassium salt. Preferably an excess of the hydroperoxide salt is employed. Residual hydroperoxide is removed by an aqueous caustic wash and the pH is adjusted to neutral with a sodium bicarbonate wash followed by a water wash. The product is isolated by stripping off most of the solvent and precipitating the polymer into a non-solvent.

Examples of suitable t-alkyl hydroperoxides that may be employed in the process include the following non-exclusive list: t-butyl hydroperoxide, t-amyl hydroperoxide, 1,1,3-trimethylbutyl hydroperoxide, 1,1,4-trimethylpentyl hydroperoxide, 1,1,3,3-tetramethylbutyl hydroperoxide and 1,1-dimethylpropynyl hydroperoxide.

Block Copolymers of Poly(e-caprolactone) and Vinyl Monomers

The poly(e-caprolactone) block copolymers of this invention are prepared by initiating a free radical polymerization of a vinyl-type monomer with a polymeric peroxide of this invention. The polymeric peroxide is decomposed into polymeric free radicals which initiate the polymerization of the vinyl monomer forming vinyl polymers (or copolymers) containing one or more poly(e-caprolactone) blocks. If a poly(e-caprolactone) initiator containing one peroxy end group is used as the initiator and the vinyl polymerization terminates by H-abstraction or by disproportionation, an A-B type block copolymer is formed. If the polymerization terminates by coupling of the growing polymer chains, an A-B-A type block copolymer is formed, where A is the poly(e-caprolactone) block and B is a vinyl polymer block. If the poly(e-caprolactone) initiator contains two peroxy end groups and the polymerization terminates by H-abstraction or by disproportion, the block copolymer will be a B-A-B type and if the polymerization terminates by coupling, the block copolymer will be an (A-B)$_n$ type block copolymer. Vinyl homopolymer will also be generated in all cases.

For example:

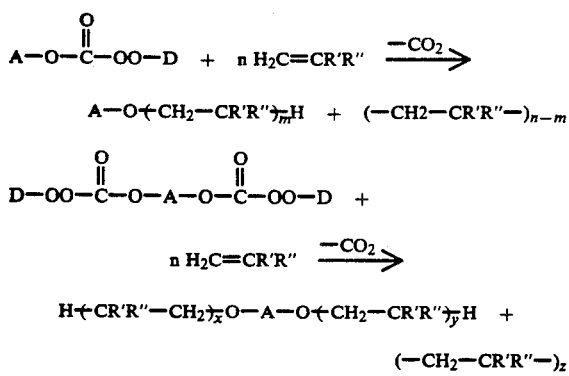

where D is a t-alkyl group, $H_2C=CR'R''$ is a vinyl monomer, A is a poly(e-caprolactone) radical and $x+y+z=n$.

The polymerization may be carried out in solution, in bulk or in an emulsion phase. The polymerization may be initiated by decomposing the peroxy-endcapped poly(e-caprolactone) thermally or by radiation. The amount of peroxy-terminated poly(e-caprolactone) employed in the polymerization may vary from about 5% to about 200% of the total vinyl monomer charge. Preferably, the amount employed is equal to about 50% to about 150% by weight of the total monomer charge. Most preferably, about equal amounts of the peroxy polymer and the vinyl monomer are employed. The vinyl monomer charge may be a single vinyl monomer or a mixture of copolymerizable vinyl monomers. In the latter case, the block polymer product will be composed of blocks of poly(e-caprolactone) and blocks of the vinyl copolymer.

The radically copolymerizable monomers suitable for polymerization by the peroxy-endcapped poly(e-caprolactones) of this invention include: alpha, beta-ethenically unsaturated carboxylic acids having from 3 to 8 carbon atoms, and derivatives thereof selected from esters of $C_1$–$C_{20}$ alcohols such as methyl (meth)acrylate, ethyl (meth)acrylate, n-butyl (meth)acrylate and the like; acrylamide, methacrylamide and amides of $C_1$–$C_{20}$ amines such as, N,N-dimethylacrylamide, vinyl esters, such as vinyl acetate, vinyl propionate and the like; unsaturated nitriles, such as (meth)acrylonitrile and the like; conjugated dienes, such as butadiene, isoprene and the like; alpha-olefins, such as ethylene, propylene, butene-1 and the like; halogenated vinyl monomers, such as vinyl chloride, vinylidene chloride and the like; $C_2$–$C_{12}$ vinyl monomers, such as 4-vinylpyridine, vinyl pyrrolidone, ethyl vinyl ether, N-vinylcarbazole and the like, $C_5$–$C_{10}$ allylically unsaturated monomers, such as allyl acetate, diallyl phthalate and the like and $C_8$–$C_{16}$ styryl monomers, such as styrene, 4-chlorostyrene, alpha-methylstyrene and the like.

Graft Copolymers of Poly(e-caprolactones)

The graft copolymers of poly(e-caprolactone) may be prepared by decomposing the peroxide groups of the peroxy-endcapped poly(e-caprolactones) in the presence of suitable polymeric substrates having abstractable hydrogen atoms. The decomposition of the peroxide may be initiated by heating the polymeric mixture above the decomposition temperature of the peroxide or by exposing it to radiation. Preferably, the grafting reaction is carried out by mixing the polymeric peroxide with the grafting substrate in an extruder or other suitable melt mixing apparatus for a sufficient length of time and at a sufficient temperature that essentially all the peroxide has decomposed before the copolymer is removed from the melt mixing apparatus. The temperature should be held low enough throughout the grafting reaction that minimal undesirable degradation of the polymer or the graft copolymer occurs.

Utility

The poly(e-caprolactones) endcapped with OO-t-alkyl monoperoxycarbonate groups of this invention are useful as:
1. Initiators for polymerization of ethenically unsaturated monomers;
2. Initiators for preparing poly(e-caprolactone) block copolymers;
3. Curing agents for unsaturated polyester resins;
4. Crosslinking and curing agents for polyolefins and elastomers;
5. Rheology modifiers for polypropylene;
6. Grafting agents for attaching poly(e-caprolactone) chains onto polyolefins;
7. Preparation of interpenetrating polymer networks;
8. Modification agents for the preparation of graft polyols.

The peroxy polymers of this invention are especially useful in the preparation of block and graft copolymers of poly(e-caprolactone). The block and graft copolymers generated from the peroxy polymers of this invention are useful as compatibilizing agents for immiscible polymer blends. The poly(e-caprolactone-styrene) block copolymer generated from the polymerization of styrene with a peroxide of this invention will compatibilize blends of polystyrene with polypropylene, polyurethane, poly(vinyl chloride), polycarbonate, acrylonitrile-butadiene-styrene terpolymer, styrene-acrylonitrile copolymer and styrene-maleic anhydride copolymer to name a few. Likewise, the poly(e-caprolactone-methyl methacrylate) block copolymer generated from the initiation of methyl methacrylate polymerization with a peroxide of this invention will compatibilize blends of poly(methyl methacrylate) with polypropylene, polyurethane, poly(vinyl chloride), polycarbonate, acrylonitrile-butadiene-styrene terpolymer, styrene-acrylonitrile copolymer and styrene-maleic anhydride copolymer to name a few.

In general, block copolymers generated from the initiation of a vinyl-type polymerization with a peroxy-endcapped poly(e-caprolactone) of this invention, will compatibilize immiscible polymer blends of component G and component H where component G is a polymer that is miscible with poly(e-caprolactone) and component H is a vinyl polymer corresponding to the vinyl polymer in the block copolymer or component H is a vinyl polymer miscible with the vinyl polymer component of the block copolymer. The degree of compatibilization obtained in the polymer blend is dependent upon the weight % of block copolymer added to the immiscible blend, the size of the polymeric blocks in the copolymer, the weight % ratio of the two blocks in the block copolymer and the type of block copolymer employed. Preferably, the block copolymer is an A-B type, a B-A-B type, an A-B-A type or an $(A-B)_n$ type and the polymeric blocks are of at least 2500 molecular weight. Most preferably, the block copolymer is an A-B type or a B-A-B type and the size of the polymeric blocks are of at least 10,000 molecular weight and are in approximately the same molecular weight range (i.e. 10,000–20,000).

The block copolymers may be used to improve the physical properties of a number of polymers or polymer blends. They can be used to improve the dyeability of polyolefin fibers, increase impact resistance of selected polymers or polymer blends, increase stress crack resistance, clarity and antiblock characteristics of polyethylene and improve the gloss of extruded thermoplastics. They may also serve as polymeric plasticizers and surfactants.

EXPERIMENTAL

The following examples are presented to further illustrate the best mode contemplated by the inventors and to provide a more detailed explanation of the present invention. They are intended as illustrations and not limitations of the invention.

STARTING MATERIALS

TONE 220, TONE 260, TONE P-300 and TONE P-700 were obtained from Union Carbide Chemicals and Plastics Company Inc.

t-Butyl and t-amyl hydroperoxides are products of Elf Atochem North America, Inc.

4-Dimethylaminopyridine and triethylamine are available from Aldrich Chemical Co.

EXAMPLE I

Preparation of TONE P-300 Bis(OO-t-butyl monoperoxycarbonate)

Preparation of TONE P-300 Bis Chloroformate

Into a 3-neck 1 liter flask in a high velocity fume hood was added 300 grams (0.02 mole) of TONE P-300 and 600 mls of xylene. The flask was equipped with a magnetic stirrer, thermometer and an addition funnel containing a Y-tube and dry ice condenser. The mixture was warmed to 30° C. to dissolve the polycaprolactone in the xylene. After all the polymer had dissolved, approximately 60 mls of phosgene (0.5 mole) were condensed into the dropping funnel using a dry ice condenser. The condensed phosgene was slowly added to the stirring xylene solution at room temperature and the solution stirred for two hours at room temperature. The solution slowly turned from clear yellow to dark purple. The excess phosgene was stripped from the solution under reduced pressure and condensed in a dry ice trap for hydrolysis and neutralization. Approximately 150–200 mls of xylene was stripped from the chloroformate solution to insure complete removal of the excess phosgene. The stripped solution was a viscous clear purple liquid containing approximately 0.02 mole of the TONE P-300 chloroformate.

Preparation of TONE P-300 Bis(OO-t-butyl Monoperoxycarbonate)

Into a liter 3 neck flask, was added 9.0 grams (0.07 mole) of 70% t-butyl hydroperoxide and 200 mls of xylene. The flask was equipped with a magnetic stirrer, thermometer, reflux condenser and addition funnel. Approximately ¼ (0.005 mole) of the bis chloroformate solution from above was added to the t-butyl hydroperoxide solution. The solution was stirred for an additional 10 minutes to obtain complete solution and 3.0 grams (0.03 mole) of triethylamine were added to the addition funnel and added dropwise to the stirring solution. The color of the reaction immediately changed from purple to yellow and the reaction temperature rose from 24°–27° C. The reaction was stirred an additional hour at room temperature and 200 mls of 2% HCl added. The mixture was transferred to a separatory funnel and the aqueous layer containing the triethylamine hydrochloride was separated. The xylene solution was washed with 100 mls of water and then stirred into 250 mls of 5% sodium bisulfite to reduce any residual hydroperoxide. The separation of the aqueous layer was poor and required approximately 1 hour to settle. After separating off the bisulfite layer, the xylene solution was washed twice with water. The wet xylene solution was stripped of xylene and water under reduced pressure on a rotating evaporator at 40°–50° C. until about 80%–90% of the xylene had been removed. The viscous residue was stirred into 1200 mls of methyl t-butyl ether and the resultant slurry stirred 1 hour. The solids were filtered off and air dried in a hood overnight. The polymer weighed 68 grams and had a melting point of 55°–58° C. The Act(O) content of the peroxypolymer was determined to be 0.2% (theoretical=0.21%) by iodometric titration. The yield was approximately 89%. The methyl t-butyl ether was stripped from the xylene and was suitable for recycle.

EXAMPLE II

Preparation of TONE P-300 Bis(OO-t-amyl Monoperoxycarbonate)

The TONE P-300 bis chloroformate was prepared using the same procedure used in Example I except it was only run on a 0.0066 molar scale. The concentrated xylene solution weighed 187 grams. Into a one liter three neck flask was added 10.1 grams (0.084 mole) of 85% t-amyl hydroperoxide, 0.1 gram 4-dimethylaminopyridine and 100 mls of xylene. The flask was equipped with a magnetic stirrer, addition funnel, thermometer and reflux condenser. The xylene solution of the TONE P-300 bis chloroformate was added and the solution stirred 10 minutes to obtain complete solution. To the stirred solution, 3.6 grams (0.036 mole) triethylamine was added dropwise from the addition funnel. The color of the reaction solution immediately changed from orange to yellow and the reaction temperature rose from 22° to 26° C. The reaction was stirred an additional two hours and 100 mls of 2% HCl added. The mixture was transferred to a separatory funnel and the aqueous layer containing the amine hydrochlorides separated. The xylene layer was washed with water and then added to 100 mls of 5% sodium bisulfite and mixed gently to reduce the excess t-amyl hydroperoxide. The separation of the aqueous layer was poor and required approximately 1 hour to settle. After separating off the bisulfite layer, the xylene solution was washed twice with water. The wet xylene solution was stripped of xylene and water under reduced pressure on a rotating evaporator at 40°–50° C. until about 80%–90% of the xylene had been removed. The viscous residue was stirred into 2400 mls of methyl t-butyl ether and the resultant slurry stirred 1 hour. The solids were filtered off and air dried in a hood overnight. The polymer weighed 82.6 grams and had a melting point of 55°–58° C. The Act(O) content of the peroxypolymer was determined to be 0.19% (theoretical=0.21%) by iodometric titration. The yield was approximately 82%. An additional 3.0 grams of peroxypolymer having an Act(O) content of 0.64% were obtained upon allowing the methyl t-butyl ether filtrate to stand overnight and refiltering the solids that formed. The methyl t-butyl ether was stripped from the xylene and was suitable for recycle.

EXAMPLE III

Preparation of TONE 260 Bis(OO-t-amyl monoperoxycarbonate)

Preparation of TONE 260 Bis Chloroformate

Into a 250 ml 3-neck flask in a high velocity fume hood was added 50 grams (0.0167 mole) of TONE 260 and 100 mls of xylene. The flask was equipped with a magnetic stirrer, thermometer and an addition funnel containing a Y-tube and dry ice condenser. The mixture was warmed to 30° C. to dissolve the polycaprolactone in the xylene. After all the polymer had dissolved, approximately 10 mls of phosgene (0.083 mole) were condensed into the dropping funnel using a dry ice condenser. The condensed phosgene was slowly added to the stirring xylene solution at room temperature and the solution stirred for five hours at room temperature and then allowed to stand overnight. The solution slowly turned from clear yellow to dark purple. The excess phosgene and some xylene was stripped from the solution under reduced pressure and condensed in a dry ice trap for hydrolysis and neutralization. The solution was stripped to a weight of 137.7 grams.

Preparation of TONE 260 Bis(OO-t-amyl monoperoxycarbonate)

Into a 500 ml 3 neck flask, was added 13.4 grams (0.133 mole) of triethylamine, 0.5 gram (0.004 mole) of 4-dimethylaminopyridine and 50 mls of xylene. The flask was equipped with a magnetic stirrer, thermometer, reflux condenser and additional funnel. The xylene solution of the bis chloroformate (0.0167 mole) from above was added to the amine solution. The solution was stirred for 10 minutes to obtain complete solution. A solution of 16.1 grams (0.133 mole) of 85% t-amyl hydroperoxide in 20 mls of xylene was added dropwise from the addition funnel to the stirring chloroformate solution at room temperature. The reaction turned creamy and thickened during the hydroperoxide addition The reaction mixture was stirred for two hours at 30° C. and 100 mls of 2% HCl added. The mixture was transferred to a separatory funnel and the aqueous layer containing the amine hydrochlorides was separated. The xylene solution was washed with 100 mls of water and then stirred into 100 mls of 5% sodium bisulfite to reduce any residual hydroperoxide. The temperature exothermed from 32° to 37° C. The bisulfite layer was separated and the xylene solution was washed twice with water. The wet xylene solution was stripped of xylene and water under reduced pressure on a rotating evaporator at 40°-50° C. to a weight of approximately 70 grams. The viscous residue was stirred into 200 mls of methyl t-butyl ether and the resultant slurry stirred 1 hour. The solids were filtered off and air dried in a hood overnight. The polymer weighted 30 grams. The Act(O) content of the peroxypolymer was determined to be 0.71% (theoretical=0.99%) by iodometric titration. The isolated yield was approximately 55%. The methyl t-butyl ether was stripped from the xylene and was suitable for recycle. Some polymeric residue remained in the residual xylene.

EXAMPLE IV

Preparation of TONE 260 Bis(OO-t-butyl monoperoxycarbonate)

Preparation of TONE 260 Bis Chloroformate

Into a 250 ml 3-neck flask in a high velocity fume hood was added 50 grams (0.0167 mole) of TONE 260 and 100 mls of xylene. The flask was equipped as in Example III. The mixture was warmed to 40° C. to dissolve the polycaprolactone in the xylene. After all the polymer had dissolved, approximately 10 mls of phosgene (0.083 mole) were condensed into the dropping funnel using a dry ice condenser. The condensed phosgene was slowly added to the stirring xylene solution at room temperature and the solution stirred for 30 minutes. The dropping funnel was replaced by another dropping funnel containing 5.0 grams (0.05 mole) triethylamine. The triethylamine was added dropwise to the stirring xylene solution. The reaction temperature exothermed from 28° to 30° C. and there was considerable fuming inside the reaction flask. The fuming subsided within a couple of minutes. The reaction was warmed to 40° C. and stirred for five hours at 40° C. before cooling to room temperature and allowing to stand overnight. The next day the excess phosgene and some xylene was stripped from the solution under reduced pressure and condensed in a dry ice trap for hydrolysis and neutralization. The solution was stripped to a weight of 127.2 grams.

Preparation of TONE 260 Bis(OO-t-butyl monoperoxycarbonate)

Into a 250 ml 3 neck flask, was added 11.6 grams (0.09 mole) of 70% t-butyl hydroperoxide and 50 mls of xylene. The flask was equipped with a magnetic stirrer, thermometer, reflux condenser and addition funnel. Fifty grams of the 41% xylene solution of the bis chloroformate (0.0067 mole) from above was added to the hydroperoxide solution. The solution was stirred for 10 minutes to obtain complete solution. A solution of 6.1 grams (0.05 mole) of 4-dimethylaminopyridine in xylene was added dropwise to the stirring chloroformate solution at room temperature. The reaction temperature rose from 23° to 30° C. and the reaction mixture went from cloudy to clear. The reaction mixture was stirred for one hour at 25° C., warmed to 40° C. and stirred for an additional hour at 40° C. The reaction mixture was cooled to room temperature and 50 mls of 5% HCl added. The mixture was transferred to a separatory funnel and the aqueous layer containing the amine hydrochloride was separated. The xylene solution was washed with 100 mls of water and then stirred into 100 mls of 5% sodium bisulfite to reduce any residual hydroperoxide. The temperature exothermed from 24° to 30° C. The bisulfite layer was separated and the xylene solution was washed twice with water. The wet xylene solution was stripped of xylene and water under reduced pressure on a rotating evaporator at 40°-50° C. to a weight of approximately 50 grams. The viscous residue was stirred into 200 mls of methyl t-butyl ether and the resultant slurry stirred 1 hour. The solids were filtered off and air dried in a hood overnight. The polymer weighed 11.9 grams. The Act(O) content of the peroxypolymer was determined to be 0.62% (theoretical=1.0%) by iodometric titration. The isolated yield was approximately 57%. The methyl t-butyl ether was stripped from the xylene and was suitable for recycle.

Some polymeric residue remained in the residual xylene.

EXAMPLE V

Preparation of TONE P-700 Bis(OO-t-butyl monoperoxycarbonate)

Preparation of TONE P-700 Bis Chloroformate

Into a 3-neck 500 ml flask in a high velocity fume hood was added 50 grams (0.00125 mole) of TONE P-700 and 300 mls of xylene. The flask was equipped with a magnetic stirrer, thermometer and an addition funnel containing a Y-tube and dry ice condenser. The mixture was warmed to about 50° C. to dissolve the polycaprolactone in the xylene. After all the polymer had dissolved, approximately 12 mls of phosgene (0.1 mole) were condensed into the dropping funnel using a dry ice condenser. The condensed phosgene was slowly added to the stirring xylene solution at room temperature and the solution stirred for 15 minutes at room temperature. At this point 1 gram (0.01 mole) of triethylamine was added dropwise. There was a considerable amount of fuming during the triethylamine addition. The reaction temperature rose from 22° to 25° C. The reaction was stirred for 1 hour at 25° C. and then warmed to 45° C. and stirred an additional 4.5 hours at 45° C. and then allowed to stand at room temperature overnight. The excess phosgene and some xylene were stripped from the solution under reduced pressure and condensed in a dry ice trap for hydrolysis and neutralization. The concentrated solution weighed 191.2 grams. The concentration of the bis chloroformate was approximately 27% by weight and it contained approximately 0.00125 mole of the TONE P-700 chloroformate.

Preparation of TONE P-700 Bis(OO-t-butyl monoperoxycarbonate)

Into a 250 ml 3 neck flask, was added 1.3 grams (0.01 mole) of 70% t-butyl hydroperoxide and 50 mls of xylene. The flask was equipped with a magnetic stirrer, thermometer, reflux condenser and addition funnel. Approximately 50 grams (0.00034 mole) of the bis chloroformate solution from above was added to the t-butyl hydroperoxide solution. The solution was stirred for an additional 10 minutes to obtain complete solution and 1.0 grams (0.008 mole) of 4-dimethylaminopyridine were added to the stirring solution. The reaction immediately changed from a creamy yellow color to a creamy white color. The reaction was warmed to 40° C. and stirred one hour. The reaction was diluted with 100 mls of 2% HCl and the mixture was transferred to a separatory funnel. The aqueous layer containing the 4-dimethylaminopyridine hydrochloride was separated. The xylene solution was washed with 100 mls of water and then stirred into 100 mls of 5% sodium bisulfite to reduce any residual hydroperoxide. The separation of the aqueous layer was very poor and required several hours to separate. After separating off the bisulfite layer, the xylene solution was washed twice with water (long separations). The wet xylene solution was stripped of xylene and water under reduced pressure on a rotating evaporator at 40°-50° C. until the residue weighed 65 grams. The viscous residue was stirred into 1200 mls of methyl t-butyl ether and the resultant slurry stirred 1 hour. The solids were filtered off and air dried in a hood overnight. The solids were large rubbery particles. The solids were slurried in hexane and poured into a blender and the particles ground up at high speed in the presence of the hexane. The solids were filtered off and air dried in a hood overnight. The dry polymer weighed 10.7 grams. The Act(O) content of the peroxypolymer was determined to be 0.05% (theoretical=0.08%) by iodometric titration. The yield was approximately 81%. The methyl t-butyl ether was stripped from the xylene and was suitable for recycle.

EXAMPLE VI

Preparation of TONE 220 Bis(OO-t-butyl monoperoxycarbonate)

Preparation of TONE 220 Bis Chloroformate

Into a 3-neck 500 ml flask was added 201.9 grams (0.2 mole) of melted TONE 220. The flask was equipped with a magnetic stirrer, thermometer and an addition funnel containing a Y-tube and dry ice condenser and placed in a high velocity fume hood. The flask was heated to 40° C. in a warm water bath to keep the polycaprolactone melted. Approximately 35 mls of phosgene (0.48 mole) were condensed into the dropping funnel using a dry ice condenser. The condensed phosgene was added to the stirring polycaprolactone over 1 hour at 40°-49° C. The first third of the addition was exothermic and the temperature rose from 42° to 49° C. The last two thirds of the phosgene addition was not exothermic and the reaction was heated to maintain the temperature at 45°-55° C. The reaction turned from clear yellow to amber. The reaction was stirred for 3 hours at 50°-60° C. The excess phosgene was stripped from the reaction at 50°-60° C. under reduced pressure for 4.5 hours. The stripped product was a soft waxy solid weighing 227.4 grams(theo. 226.8). The hydrolyzable chloride content of the residue was 6.50% (theo. 6.26%).

Preparation of TONE 220 Bis(OO-t-butyl monoperoxycarbonate)

Into a 250 ml 3 neck flask, was added 11.6 grams (0.09 mole) of 70% t-butyl hydroperoxide, 32.0 grams of 10% aqueous NaOH and 30 mls of methylene chloride. The flask was equipped with a magnetic stirrer, thermometer, reflux condenser and addition funnel containing a solution of 22.7 grams of the TONE 220 bis chloroformate (0.02 mole) in 50 mls methylene chloride. The chloroformate solution was added to the stirring solution of the sodium salt o t-butyl hydroperoxide over 15 minutes at 25° C. The reaction was warmed to 30° C. and stirred 1.5 hours The reaction mixture was transferred to a separatory funnel and the layers allowed to separate. The methylene chloride layer was separated and washed with 30 mls of 5% NaOH for 2 minutes at 25°-30° C. to remove residual hydroperoxide. After separation, the methylene chloride layer was washed with water, 5% $NaHCO_3$, water and dried over $Na_2SO_4$. The methylene chloride solution was filtered and the methylene chloride stripped off on a rotating evaporator under reduced pressure leaving 23.2 grams (93.5% yield) of a low melting solid (m.p. 25°-31° C.). The Act(O) content of the peroxypolymer was determined to be 2.25% (theoretical=2.58%) by iodometric titration.

EXAMPLE VII

Preparation of Polycaprolactone-Polystyrene Block Copolymers

Test tubes containing a solution of 10 grams of styrene and increasing amounts (i.e. 1, 2, 3, 4 and 5 grams) of the TONE bis(OO-t-butyl monoperoxycarbonate) of Examples I and IV, were nitrogen purged, heat sealed and refrigerated overnight. The next day the samples were immersed in an oil bath at a temperature profile of 110° C. for 2 hours, 120° C. for 2 hours and 130° C. for 2 hours. Upon completion of the reaction period, the test tubes were removed from the bath and cooled to room temperature. The samples had formed a solid white (opague) plug in the test tubes. The test tubes were broken and the polymer removed. The polymers were pulverized and submitted for molecular weight determinations. The results are summarized in Tables I and II. The following trends were observed:

1. The molecular weight averages decreased with increasing peroxide concentration. As the peroxide concentration increased, more polystyrene chains were initiated, resulting in lower molecular weight.
2. The molecular weight averages were lower for the samples containing the TONE 260 peroxide. The peroxide concentration in the TONE 260 peroxide is much higher than the peroxide concentration in the TONE P-300 peroxide which results in more polystyrene chains being initiated and a lower molecular weight.
3. All of the TONE was incorporated into the block copolymer. The GPC trace had only one peak. If TONE homopolymer was present, a bimodal peak would be present in the GPC trace due to the low molecular weight TONE homopolymers and the higher molecular weight block copolymers.

The block copolymer was separated from the polystyrene homopolymer and any unreacted styrene by dissolving the crude polymer in warm amyl acetate and cooling to −20° C. The block copolymer fell out of solution upon cooling while the styrene and polystyrene homopolymer remained completely soluble at −20° C. The cold samples were filtered and the insolubles dried. The infrared scans of the product contained a strong ester band at 1725 cm$^{-1}$ and all the characteristic polystyrene bands. The infrared scan of the sample is very similar to the scan produced by overlapping the infrared scans of the TONE P-300 homopolymer and polystyrene homopolymer.

The DSC scan of the TONE P-300-polystyrene block copolymer had a distinct melting at 57°–58° C. (indicative of the TONE P-300 segment) and a Tg at 106°–107° C. (indicative of the polystyrene segment).

TABLE I

Polymerization of Styrene with TONE 300 Peroxypolymer of Example I

| TONE 300 Peroxypolymer (grams) | Molecular Weight | | |
|---|---|---|---|
| | Mn | Mw | Mz |
| 1.0 | $1.38 \times 10^5$ | $3.55 \times 10^5$ | $6.44 \times 10^5$ |
| 2.0 | $1.00 \times 10^5$ | $3.18 \times 10^5$ | $6.36 \times 10^5$ |
| 3.0 | $8.55 \times 10^4$ | $2.98 \times 10^5$ | $6.25 \times 10^5$ |
| 4.0 | $8.08 \times 10^4$ | $2.74 \times 10^5$ | $5.94 \times 10^4$ |
| 5.0 | $7.59 \times 10^4$ | $2.65 \times 10^5$ | $5.95 \times 10^5$ |

TABLE II

Polymerization of Styrene with TONE 260 Peroxypolymer of Example IV

| TONE 260 Peroxypolymer (grams) | Molecular Weight | | |
|---|---|---|---|
| | Mn | Mw | Mz |
| 1.0 | $6.18 \times 10^4$ | $2.15 \times 10^5$ | $9.34 \times 10^5$ |
| 2.0 | $2.12 \times 10^4$ | $6.28 \times 10^4$ | $1.32 \times 10^5$ |
| 3.0 | $1.71 \times 10^4$ | $7.62 \times 10^4$ | $2.57 \times 10^5$ |
| 4.0 | $1.54 \times 10^4$ | $8.14 \times 10^4$ | $4.19 \times 10^5$ |
| 5.0 | $1.53 \times 10^4$ | $7.31 \times 10^4$ | $3.17 \times 10^5$ |

The subject matter which the applicants regard as their invention is particularly pointed out and distinctly claimed as follows:

1. Peroxy terminated poly(e-caprolactones) of formula I:

$$(A-X-)_m\text{-R-}(X'-B)_n \qquad \text{I}$$

wherein
A is

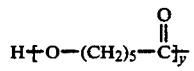

B is

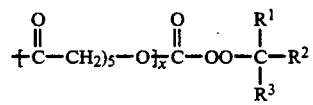

m is an integer of 0 to 3,
n is an integer of 1 to 4,
and m+n is an integer of 1 to 4,
$R^1$ and $R^2$ are the same or different and are selected from alkyl groups having 1 to 4 carbon atoms;
$R^3$ is an alkyl group having 1 to 12 carbons or an acetylenic group of 2 to 12 carbons;
y is an integer and varies from 0 to 10,000,
x is an integer and varies from 4 to 22,000, and
(y)(m)+(x)(n) is an integer and varies from 4 to 22,000;
X and X' are the same or different and are selected from —O—, or —N($R^4$)—;
R is a substituted or unsubstituted aliphatic, alicyclic, aromatic or araliphatic radical, diradical, triradical or tetraradical,
when n+m is 1, R is a substituted or unsubstituted aliphatic radical of 1 to 20 carbons, a substituted or unsubstituted alicyclic radical of 5 to 18 carbons, a substituted or unsubstituted aromatic radical of 6 to 14 carbons, a substituted or unsubstituted araliphatic radical of 7 to 22 carbons or a substituted or unsubstituted aromatic or non-aromatic heterocyclic radical of 5 to 12 carbons,
when n+m is 2, R is a substituted or unsubstituted aliphatic diradical of 2 to 20 carbons, a substituted or unsubstituted aliphatic diradical of 4 to 20 carbons or a substituted or unsubstituted aliphated diradical of 4 to 20 carbons or a substituted or unsubstituted aliphatic diradical of 4 to 20 carbons which is interrupted by one to three —O—, —S— or —N($R^4$)— groups in the chain with the proviso that multiple heteroatoms must be separated from each other and the diradical chain ends by at least two carbon atoms, a substituted or unsubstituted alicyclic diradical of 5 to 18 carbons, a substituted or unsubstituted carbocyclic aromatic diradical of 6 to 12 carbons or a substituted or unsubstituted araliphatic diradical of 7 to 22 carbons, when n+m is 3, R is a substituted or unsubstituted aliphatic triradical of 3 to 20 carbons, a substituted or unsubstituted alicyclic triradical of 5 to 18 carbons, a substituted or unsubstituted aromatic triradical of 6 to 14 carbons or a substituted or unsubstituted araliphatic triradical of 7 to 22 carbons, when n+m is 4, R is a substituted or unsubstituted aliphatic tetraradical of 4 to 20 carbons, a substituted or unsubstituted alicyclic tetraradical of 6 to 18 carbons, a substituted or unsubstituted aromatic tetraradical of 6 to 14 carbons or a substituted or unsubstituted araliphatic tetraradical of 7 to 22 carbons;

$R^4$ is hydrogen, substituted or unsubstituted aliphatic of 1–20 carbons, substituted or unsubstituted alicyclic of 5–18 carbons, substituted or unsubstituted aromatic of 6–14 carbons, or substiuted or unsubstituted araliphatic of 7–22 carbons; and substituents for R and $R^4$ are selected from one or more of chloro, bromo, alkyl of 1–8 carbons, alkoxy of 1–12 carbons, aryloxy of 6–10 carbons, or cyano, and additional substituents for R are selected from one or more of acyloxy of 1–4 carbons, acryloyloxy or methacryloyloxy.

2. A peroxy terminated poly(e-caprolactone) as defined in claim 1 wherein:

$R^1$ and $R^2$ are methyl groups, $R^3$ is methyl, ethyl, propyl, isopropyl, butyl, neopentyl or ethynyl, $R^4$ is hydrogen, alkyl of 1–8 carbons, cycloalkyl of 5–8 carbons, aryl of 6–10 carbons or aralkyl of 7–9 carbons, n is 1 or 2 and m is 0 and (n)(x) is an integer and may vary from about 9 to about 350.

3. A peroxy terminated poly(e-caprolactone) as defined in claim 2 wherein:

when n is 1, R is a primary $C_1$–$C_{12}$ alkyl radical or an unsaturated $C_3$–$C_{12}$ alkenyl radical, either of which may be substituted with a $C_1$–$C_4$ alkoxy group or a phenoxy group and x has a value of 10–350, and when n is 2, R is a primary $C_2$–$C_{12}$ alkylene diradical or a primary $C_4$–$C_{12}$ alkenylene diradical, either of which is unsubstituted or substituted with a $C_1$–$C_4$ alkoxy group or a phenoxy group and x has a value of 10–175.

4. A peroxy terminated poly(e-caprolactone) as defined in claim 3 wherein:

$R^1$ and $R^2$ are methyl groups and $R^3$ is a methyl or ethyl group, X and X' are —O—, n is 2 and m is 0, (x)(n) is an integer and varies from about 25 to about 130 and R is a primary $C_2$–$C_6$ unsubstituted alkylene diradical.

5. A peroxy terminated poly(e-caprolactone) as defined in claim 4 wherein the poly(e-caprolactone) diradical is derived from TONE 220, TONE 260, TONE P-300 or TONE P-700.

6. A peroxy terminated poly(e-caprolactone) as defined in claim 5 which is selected from the following monoxeroxycarbonates:

bis(OO-t-butyl monoperoxycarbonate) of TONE P-300,
bis(OO-t-amyl monoperoxycarbonate) of TONE P-300,
bis(OO-t-amyl monoperoxycarbonate) of TONE 260,
bis(OO-t-butyl monoperoxycarbonate) of TONE 220,
bis(OO-t-butyl monoperoxycarbonate) of TONE 260, or
bis(OO-t-butyl monoperoxycarbonate) of TONE P-700.

7. A poly(e-caprolactone) copolymer formed by decomposing a peroxy terminated poly(e-caprolactone) as defined in claim 1 in the presence of at least one vinyl monomer.

8. A poly(e-caprolactone)-polystyrene copolymer formed by decomposing a peroxy terminated poly(e-caprolactone) as defined in claim 5 in the presence of styrene monomer.

9. A poly(e-caprolactone)-polystyrene copolymer formed by decomposing a peroxy terminated poly(e-caprolactone) as defined in claim 6 in the presence of styrene monomer.

10. A poly(e-caprolactone)-polystyrene copolymer formed by decomposing a peroxy terminated poly(e-caprolactone) as defined in claim 9 where the peroxy terminated poly(e-caprolactone) is the bis(OO-t-butyl monoperoxycarbonate) of TONE P-300.

11. A poly(e-caprolactone)-polystyrene copolymer formed by decomposing a peroxy terminated poly(e-caprolactone) as defined in claim 9 where the peroxy terminated poly(e-caprolactone) is (OO-t-butyl monoperoxycarbonate) of TONE 260.

12. A poly(e-caprolactone) copolymer formed by decomposing at least one peroxy terminated poly(e-caprolactone) as defined in claim 1 in the presence of at least one polymer having abstractable hydrogen atoms.

13. A compatibilized blend of at least two normally incompatible polymers which comprises a polycaprolactone copolymer as defined in claim 7 and at least two normally incompatible polymers at least one of which is compatible with polycaprolactone and the remainder of which is compatible with the other copolymer in said block copolymer.

14. A compatibilized blend of at least two normally incompatible copolymers which comprise a polycaprolactone copolymer as defined in claim 12 and at least two normally incompatible polymers at least one of which is compatible with polycaprolactone and the remainder of which is compatible with the other copolymer in said polycaprolactone copolymer.

* * * * *